(12) United States Patent
Basaran et al.

(10) Patent No.: US 10,275,560 B2
(45) Date of Patent: Apr. 30, 2019

(54) PLACEMENT OF CIRCUIT ELEMENTS IN REGIONS WITH CUSTOMIZED PLACEMENT GRIDS

(71) Applicant: Synopsys, Inc., Mountain View, CA (US)

(72) Inventors: Bulent Basaran, Decatur, GA (US); Jon Francis Bendicksen, New Bern, NC (US); Friedrich Gunter Kurt Sendig, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 105 days.

(21) Appl. No.: 15/593,194

(22) Filed: May 11, 2017

(65) Prior Publication Data

US 2017/0344689 A1    Nov. 30, 2017

Related U.S. Application Data

(60) Provisional application No. 62/342,155, filed on May 26, 2016.

(51) Int. Cl.
*G06F 17/50* (2006.01)

(52) U.S. Cl.
CPC ...... *G06F 17/5072* (2013.01); *G06F 17/5068* (2013.01); *G06F 17/5077* (2013.01); *G06F 17/5081* (2013.01)

(58) Field of Classification Search
CPC ............. G06F 17/5072; G06F 17/5068; G06F 17/5081; G06F 17/5077
See application file for complete search history.

(56) References Cited

U.S. PATENT DOCUMENTS

| 4,218,693 A * | 8/1980 | Gee ...................... H01L 27/0883 326/102 |
| 7,080,349 B1 * | 7/2006 | Babcock ................... G03F 1/36 716/136 |
| 7,131,094 B2 * | 10/2006 | Kolk ..................... G06F 17/5077 716/102 |
| 7,365,431 B2 * | 4/2008 | Matsubara .......... H01L 23/5226 257/459 |
| 8,129,739 B2 * | 3/2012 | Higashi ..................... H01L 33/08 257/100 |
| 9,117,824 B2 * | 8/2015 | Feng ..................... H01L 23/535 |
| 2009/0032898 A1 * | 2/2009 | Becker ................. G06F 17/5068 257/499 |
| 2012/0131528 A1 * | 5/2012 | Chen ................... G06F 17/5077 716/112 |
| 2012/0304134 A1 * | 11/2012 | Sugatani ............. G06F 17/5077 716/55 |

(Continued)

*Primary Examiner* — Helen Rossoshek
(74) *Attorney, Agent, or Firm* — Fenwick & West LLP

(57) ABSTRACT

Embodiments relate to using placement grids corresponding to repeating track patterns of metal layers in a region to place circuit elements. Each placement grid is defined by as a vertical pitch of a repeating track pattern of one metal layer and a horizontal pitch of another repeating track pattern of another metal layer. Each circuit element is assigned with a placement grid so that it can be placed in alignment with the assigned placement grid. By using the placement grids derived from the track patterns, routable placement of circuit elements can be performed automatically or manually with reduced efforts.

16 Claims, 8 Drawing Sheets

(56) References Cited

U.S. PATENT DOCUMENTS

| | | | | |
|---|---|---|---|---|
| 2014/0291731 | A1* | 10/2014 | Becker | H01L 27/11807 257/206 |
| 2015/0143309 | A1* | 5/2015 | De Dood | G06F 17/5068 716/107 |
| 2015/0324511 | A1* | 11/2015 | Nieuwoudt | G06F 17/5031 716/115 |
| 2018/0150592 | A1* | 5/2018 | Chang | G06F 17/5072 |

* cited by examiner

PLACEMENT OF CIRCUIT ELEMENTS IN REGIONS WITH CUSTOMIZED PLACEMENT GRIDS

CROSS REFERENCE TO RELATED APPLICATION

This application claims priority to U.S. Provisional Application No. 62/342,155, filed on May 26, 2016, which is incorporated by reference herein in its entirety.

BACKGROUND

Field of the Disclosure

The present disclosure generally relates to designing of an integrated circuit (IC), and specifically to placing circuit elements on placement grids customized for a region of the IC.

Description of the Related Arts

Physical design (i.e., chip layout) is one of the tasks in the process of designing ICs. A typical System on a Chip (SoC) comprises mainly two kinds of blocks: standard-cell based digital circuits, and custom circuits. The layout of the former can be automated using auto-place-and-route (APR) tools. The latter is not amenable to APR tools and requires expertise of concerted efforts of many layout design craftsmen, also known as mask designers.

During manual crafting of layout for custom circuits, one of the many tasks is placement of "blocks," "cells" and "devices" in various locations. A device herein refers to the lowest level component placed in a layout editor, including, a transistor, resistor, capacitor, etc. A device is also called a primitive component. A "cell" is the lowest-level non-primitive component and is comprised of two or more primitives, usually up to but not to exceed a few hundred devices. A "block" is comprised of two or more cells. In custom layout (e.g., layout for analog and mixed signals), it is common to see blocks with a few cells as well as blocks with thousands of cells. Mask designers use an integrated circuit (IC) layout editor as a tool for physical designing custom circuits. The IC layout editor provides sophisticated features and methods to help ease the burden due to the complex rules that the mask designers are requested to comply with. These rules, known as design rules, increase in number and become more complex with each advance in chip manufacturing technology.

Conventional IC layout editors employ a simple one-placement-grid per design methodology. However, as the semiconductor manufacturing process advances to a smaller nanometer scale, the increase in the complexity of design rules has led to track-pattern based routing approach where track patterns are often imposed for each metal layer instead of free form wiring topologies on the metal layer. In the track-pattern based routing approach, track patterns define valid locations and sizes for wiring to be laid out in a region of an IC.

SUMMARY

Embodiments relate to designing an integrated circuit (IC) by using multiple placement grids derived from track patterns of different metal layers. A first placement grid corresponding to a first repeating non-uniform track pattern of a metal layer in a region of the integrated circuit is defined. A second placement grid corresponding to a second repeating non-uniform track pattern of another metal layer in the region of the integrated circuit is defined. The second placement grid coarser than the first placement grid. The first circuit element is placed in the region to be in alignment with the first placement grid. The second circuit element is placed in the region to be in alignment with the second placement grid. A digital representation of the IC with the first circuit element aligned according to the first placement grid and the second circuit element aligned according to the second placement grid is generated.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to using placement grids corresponding to repeating track patterns of metal layers in a region to place circuit elements. Each placement grid is defined by as a vertical pitch of a repeating track pattern of one metal layer and a horizontal pitch of another repeating track pattern of another metal layer. Each circuit element is assigned with a placement grid so that it can be placed in alignment with the assigned placement grid. By using the placement grids derived from the track patterns, routable placement of circuit elements can be performed automatically or manually with reduced efforts.

A circuit element described herein refers to an element of a circuit for a placement in a circuit design. The circuit element may be one of a block, a cell, a device or a combination thereof.

Overview of EDA Design Flow

Figure 1:
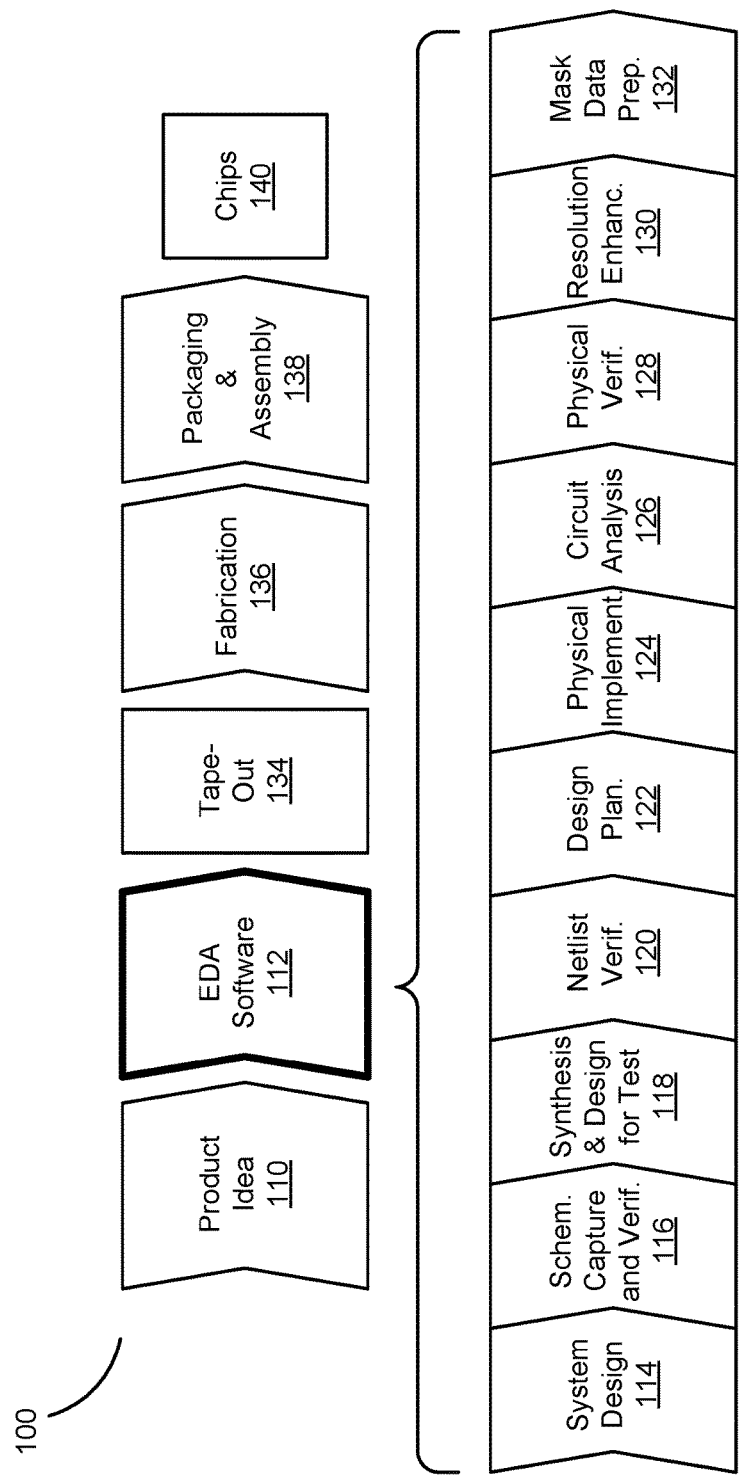
FIG. 1 is an example flow illustrating various operations for designing and fabricating an integrated circuit, according to an embodiment.

FIG. 1 is an example flow 100 illustrating various operations for designing and fabricating an integrated circuit, in accordance with an embodiment. The design process 100 starts with the generation of a product idea 110, which is realized during a design process that uses electronic design automation (EDA) software 112. When the design is finalized, it can be taped-out 134. After tape-out 134, a semiconductor die is fabricated 136 to form the various objects (e.g., gates, metal layers, vias) in the integrated circuit design. Packaging and assembly processes 138 are performed, which result in finished chips 140.

The EDA software 112 may be implemented in one or more computing devices such as the computing device 200, illustrated and described below with reference to FIG. 2. For example, the EDA software 112 is stored as instructions in a computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a different sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During schematic capture and verification 116, VHDL or Verilog code for modules in the circuit are written and the design is checked for functional accuracy. More specifically, the design is checked to ensure that it produces the correct outputs. Example EDA software products from Synopsys, Inc. of Mountain View, Calif. that can be used at this stage include: Custom Compiler®, VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Custom Compiler®, Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products. During physical verification 128, the design is checked to ensure correctness for: manufacturing, electrical issues, lithographic issues, and circuitry.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Formal verification may be performed at the stage of logic design and functional verification 116. Low power design specification is typically processed during stages synthesis and design for test 118 or netlist verification 120.

Example Computing Device

Figure 2:
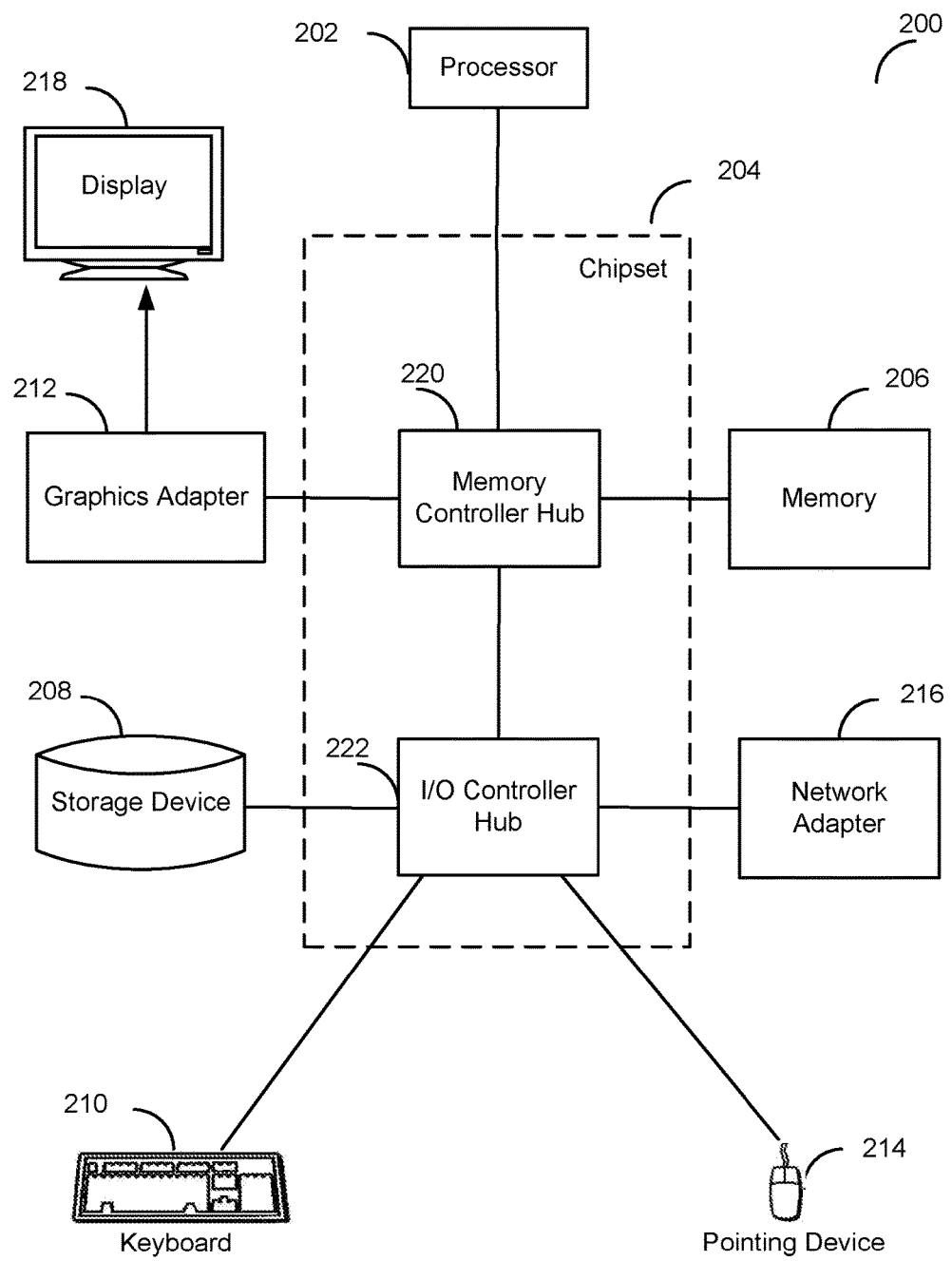
FIG. 2 is a high-level block diagram illustrating an example computing device for performing custom designing of a circuit, according to an embodiment.

FIG. 2 is a high-level block diagram illustrating an example computing device 200 for designing an integrated circuit, in accordance with an embodiment. The computing device 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computing device 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computing device 200. The graphics adapter 212 displays images and other information on the display 218. The network adapter 216 couples the computing device 200 to one or more computer networks.

The computing device 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202. The types of computing devices 200 used can vary depending upon the embodiment and requirements. For example, a computing device may lack displays, keyboards, and/or other devices shown in FIG. 10.

A layout editor system 300 described below in detail with reference to FIG. 3 below may be embodied by the computing device 200.

Example System for Reuse of Layout-Dependent Effects

Figure 3:
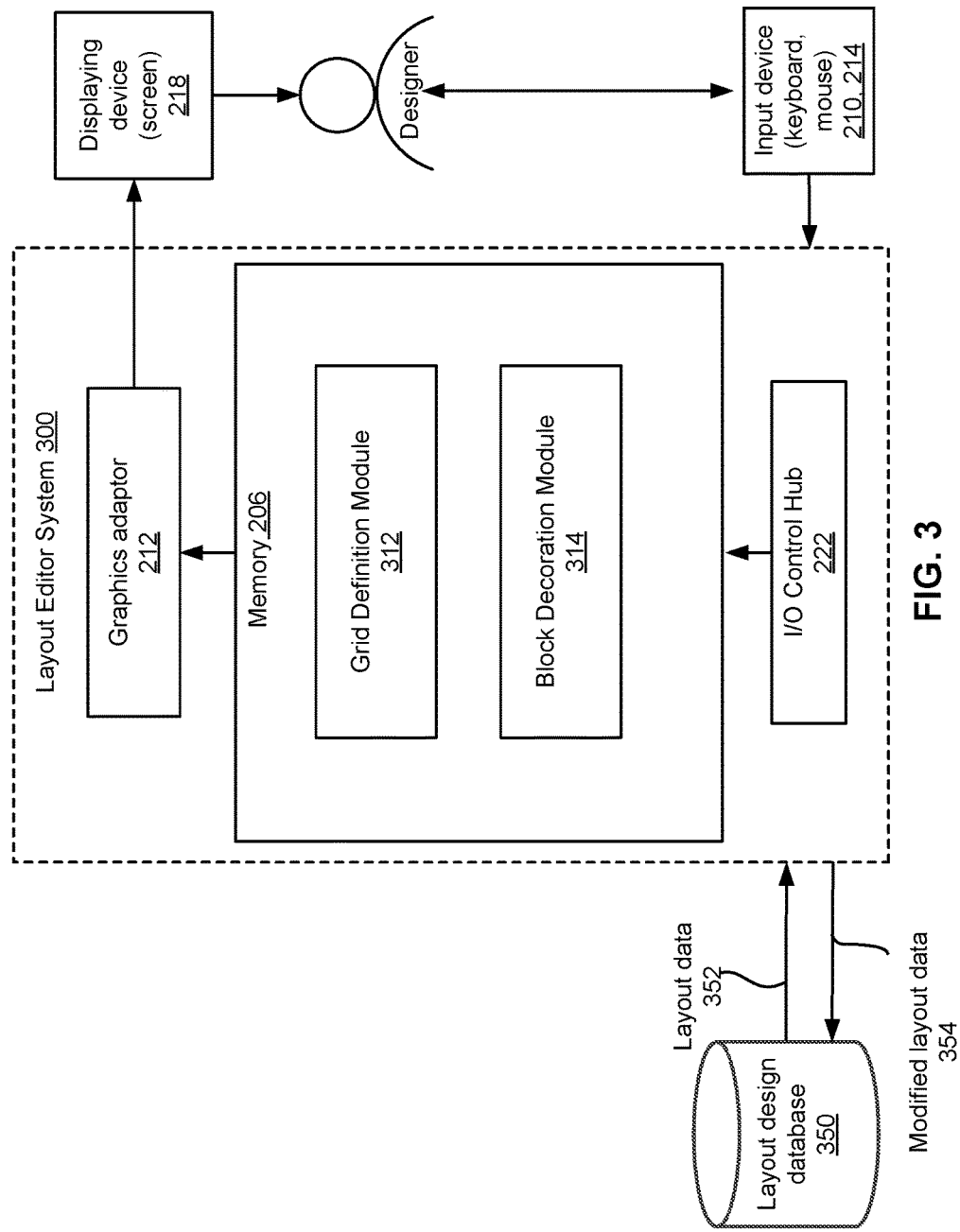
FIG. 3 is a block diagram illustrating an example layout editor system for placing circuit elements using customized track patterns, according to an embodiment.

FIG. 3 is a block diagram illustrating the layout editor system 300, according to one embodiment. The layout editor system 300 performs, among others, the operations of generating placement grids customized for regions of an integrated circuit (IC), assigning a placement grid to each circuit element for inclusion in the IC, and placing of circuit elements according to the assigned placement grids.

For this purpose, the layout editor system 300 communicates with a circuit design database 350 and interacts with a designer via input devices (e.g., keyboard 210, mouse 214) and output devices (e.g., displaying device 218). The designer inputs provided by the designer via the input devices 210, 214 may instruct the layout editor system 300 to assign placement grids to circuit components, place the circuit components in alignment with the placement grids, and display such placements on the display 218.

The circuit design database 350 is a database that interacts with the layout editor system 300 to provide or store layout data 352 and modified layout data 354. The layout data 352, as used herein, may include, physical geometric layout of patterns, number of metal layers, pre-designed track patterns for metal layers, physical processes associated with fabricating the circuit and hierarchical structure of circuit elements.

The modified layout data 354 is a version of the circuit data that is modified relative to the original layout data 352 by the layout editor system 300. The physical geometric layout of patterns is a digital representation of a circuit, for example, in GDSII format. The modified schematic and physical layout data 354 further includes geometric layout of circuit elements placed according their assigned placement grids.

The circuit design database 350 may be embodied, for example, as OpenAccess database. Although the circuit design database 350 is described as being a component separate from the layout editor system 300, the circuit design database 350 may be part of the layout editor system 300. For example, the circuit design database 350 may be a module in memory 206.

The layout editor system 300 may include, among other components, an I/O controller hub 222, a memory 206, and graphics adapter 212. The I/O controller hub 222 receives designer input from the input devices 210 and 214 as well as layout data from the circuit design database 350 external to the layout editor system 300, processes the received designer input as well as the layout data, and provides the processed information to the memory 206.

The memory 206 may store, among other modules, a grid definition module 312 and a block decoration module 314. The grid definition module 312 defines placement grids for regions of an IC based on track patterns in metal layers of the IC. Specifically, the grid definition module 312 determines the repeating pattern of tracks extending along a direction in each metal layer, defines lines of a placement grid extending in the same direction to coincide with the repeating track patterns of each metal layer, and defines the lines of the grid pattern in the orthogonal direction to coincide with repeating track patterns of a lower (or upper) metal layer. In one embodiment, the grid definition module 312 defines the pitch of a vertical/horizontal line of a grid pattern in a higher metal layer to be integer times the pitch of a vertical/horizontal line of a grid pattern in a lower metal layer.

The block decoration module 314 assigns placement grids defined by the grid definition module to a circuit component. Although it would be advantageous to assign the finest placement grid to any circuit component for the sake of compact design, using such placement grid may make the wirings unroutable. Conversely, using a coarse placement grid for circuit components may make the wiring routable, but this may increase the size taken up by the circuit components. Hence, the block decoration module 314 considers various factors and automatically assigns the placement grids to circuit elements or receives user input to assign the placement grids to the circuit elements for placement in an IC.

Example Track Patterns and Grid Example Circuit Segment

Figure 4:
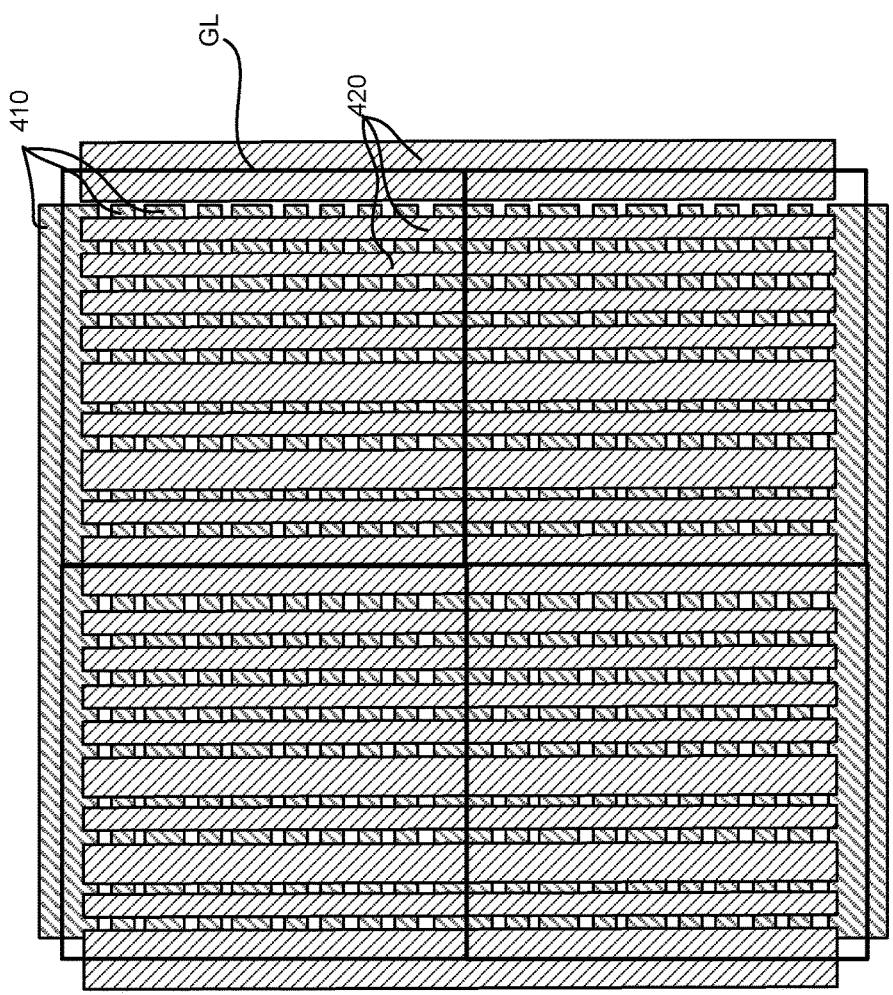
FIG. 4 is a diagram illustrating a placement grid in a region of a circuit with non-uniform track patterns, according to an embodiment.

A track pattern traditionally used in conventional layout editor system is uniform. A uniform track patterns includes a set of tracks where all the tracks have the same width and the gap between adjacent tracks is the same size. Such traditional uniform track pattern sufficed to plan and route simpler ICs of earlier times but as IR drop and clock skew became challenges due to increasing clock frequency and lower power requirements, non-uniform track plans as illustrated in FIG. 4 may be adopted. In a non-uniform track plan, tracks may have distinct widths and different sizes of gaps between adjacent tracks in the same layer.

FIG. 4 is a diagram illustrating a placement grid GL in a region of a circuit with non-uniform track patterns 410, 420, according to an embodiment. As illustrated in FIG. 4, multiple metal layers may be used to route IC. Generally, track patterns 410 extend horizontally in one metal layer, and track patterns 420 in an adjacent metal layer extend vertically. When track patterns in two adjacent metal layers are combined, placement grids GL as illustrated in FIG. 4 is formed. As higher metals are usually wider for drive larger currents, a placement grid in higher metal layers tend to be coarser than a placement grid in lower metal layers.

Figure 5:
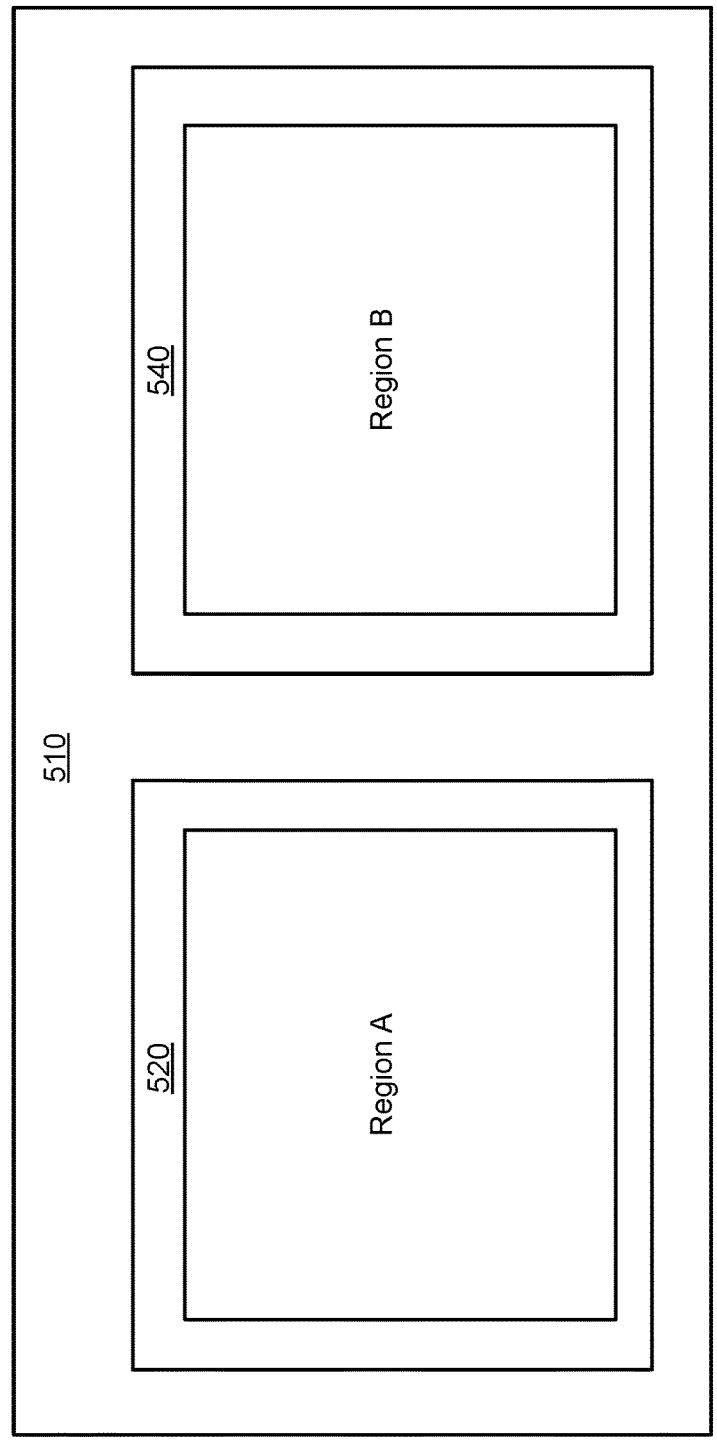
FIG. 5 is a conceptual diagram illustrating regions of an integrated circuit (IC) where different track patterns are provided, in accordance with an embodiment.

FIG. 5 is a conceptual diagram illustrating regions A, B of an IC where different track patterns are provided, in accordance with an embodiment. An IC may include many heterogeneous regions of a die. Each die is assumed to be first covered with a global region 510 of default track patterns. Whatever region not covered by local regions is defined by the global region. For special types of circuits (such as ASIC, analog, memory, etc.), new regions such as region A and region B are defined as "cut-outs" from the global region, as illustrated in FIG. 5. Regions A may be for digital circuitry while region B may be for analog circuitry.

When two regions A and B as illustrated in FIG. 5 are adjacent to each other, tracks in one will in general not align with tracks in the other. Therefore, transition regions 520, 540 are inserted to connect tracks in each region A and B. In FIG. 4, transition regions 520, 540 fully cover region A and region B, respectively. Another type of transition (not shown) is to specify a unique transition between each neighboring region.

Figure 6:
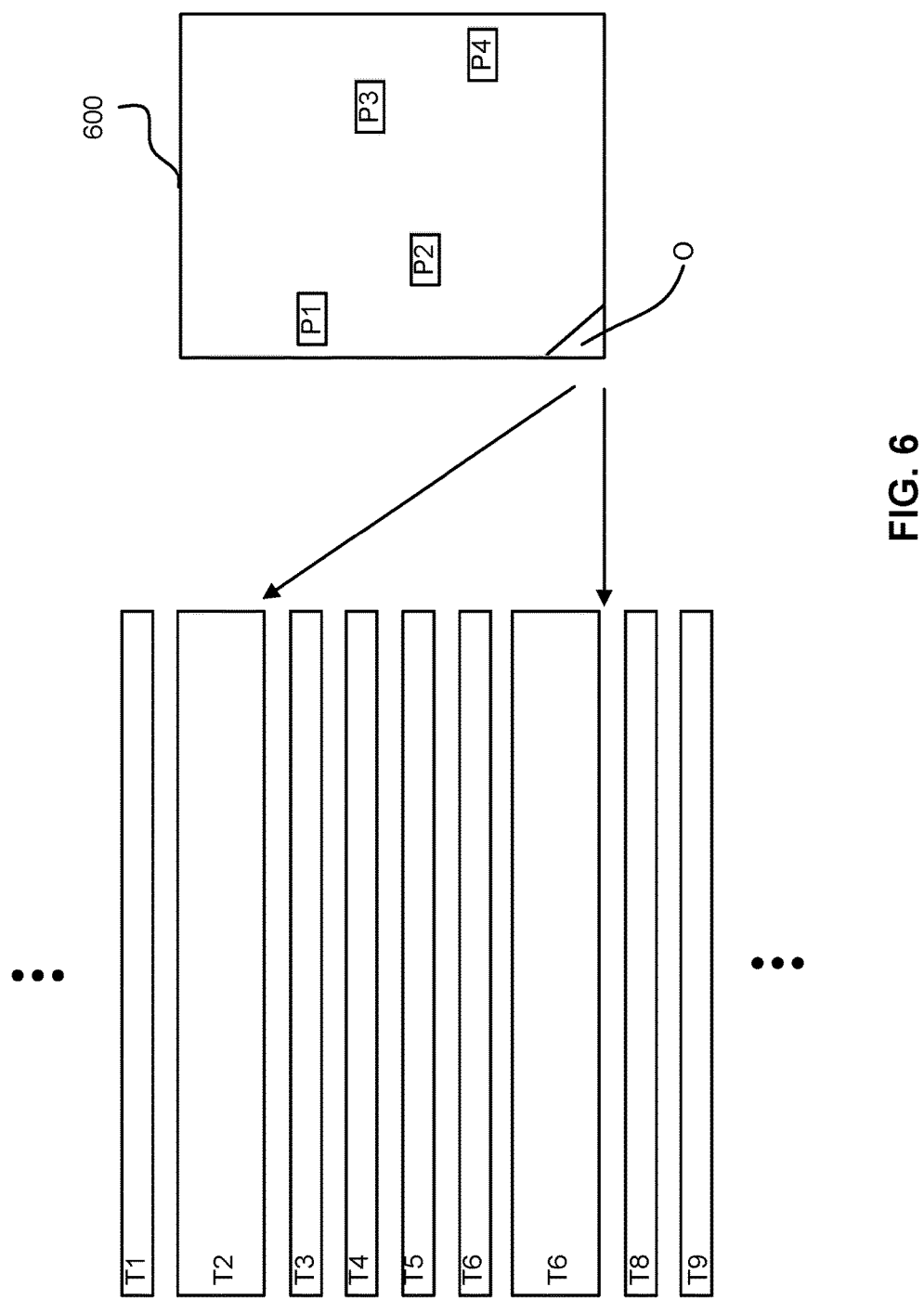
FIG. 6 is a diagram illustrating permissible locations for placing a circuit element, according to one embodiment.

It is advantageous to consider track patterns in a region when placing a circuit element in the region. FIG. 6 is a diagram illustrating permissible locations for placing a circuit element 600, according to one embodiment. In FIG. 6, the same track patterns repeat every 5 track patterns (i.e., the thick horizontal track repeats every 5 tracks).

Assuming that the circuit element 600 has four pins P1 through P4 to be placed on certain track patterns of narrow width (i.e., track T1, T4 through T6, T8 and T9) in a corresponding die region, white triangle O indicating an origin of the circuit element 600 used for aligning the circuit element 600 can be placed only at certain vertical locations (as indicated by arrows). Hence, by having a placement grid defined along the repeating tracks (e.g. T2 and T6), and placing the origin O of the circuit element 600 along the placement grid, a routable placement of the circuit element 600 can easily be made.

Hence, embodiments described herein defines placement grids based on repeating track patterns of metal layers and use such placement grids to place the circuit elements. In this way, a routable placement of circuit elements can be made easily without having to consider various restrictions such as design rules because the placement of the circuit element using the placement grid would automatically satisfy these restrictions.

Region Definition and Track Group Definition

The layout data 352 may include a region definition defining various properties of a region of an IC. Such region definition may include, among others, a list of track group definitions. The track group definitions group a number of track definitions together to define a pattern. Each track group definition specifies a metal layer (and its upper or lower metal layer), its orientation (horizontal or vertical), and pitch values in horizontal and vertical directions, among various other attributes. A list of tracks and its properties (e.g., width and spacing) is also contained in each track group definition. The track patterns are examples of instantiations of a specific track group definition. For example, the 5-repeating tracks—one wide track for power/ground and four tracks is an instantiation of a track group definition with 5 tracks.

Tracks also have a set of attributes in order to help plan various chip-interconnect wiring concerns, like power grid planning, clock synthesis, scan, test, critical and non-critical signal routing.

Note that a "track" is layer agnostic. A track group definition can be assigned to metal1, metal2, etc. to define where the tracks are. But, they can also be assigned to an instance layer to define where circuit elements can be placed or assigned to a helper layer used to draw instances of circuit elements using the layout editor system 300. The layer editor system 300 may draw and visualize objects using layer definitions.

A placement grid definition is made consistent with a corresponding track region definition. Integrating the track patterns definition and the placement grids has, among otherwise, simplifying API language for defining interconnect tracks and placement grids and seamlessly supporting non-uniform placement grids.

Auto-derivation of Placement Grid Definitions

The grid definition module 312 automatically derives a placement grid for a layer based on the track pattern of the layer. When two or more routing layers are available, a placement grid for an upper metal layer can use the lower metal layer to define repetition parameters for the orthogonal orientation. For example, assuming that only three metal layers m1, m2 and m3 are available for vertical, horizontal and vertical tracks, respectively, the grid definition module may start from the top and derive a placement grid referred to as m3pg for m3 layer. Placement grid m3pg is defined as the intersection of vertical and horizontal grid lines with the pitch of the vertical lines (x-pitch) equal to the pitch value of the m3 track pattern and the pitch of the horizontal lines (y-pitch) equal to the pitch value of the m2 track pattern. The intersection of these lines will define grid points for placement task of a circuit element (e.g., by snapping an origin point of the circuit element onto one of the grid points).

For m1pg, the placement grid is comprised only of vertical lines because there is no lower metal layer than metal layer m1, and as such, the placement grid for m1pg does not restrict the placement of circuit elements in y-coordinates.

In one embodiment, the grid definition module 312 may define placement grids based on user inputs that overrides the placement grids that are automatically generated based on track patters of metal layers. The user can create his own placement grids for whatever compelling design reason, using a graphical user interface (GUI) presented on the displaying device 218.

Assignment of Placement Grids to Circuit Elements

The block decoration module 314 assigns placement grids to circuit elements, and thereby restricts the placement of the circuit elements to be in alignment with the assigned placement grids. Such assignment of placement grids may be performed automatically. The assignment of placement grids can be determined based on various factors.

In one embodiment, if a circuit element has a physical pin on a metal layer, the circuit element is assigned with a placement grid that is defined using the track patterns of the metal layer. Taking the above example, if the circuit element has a pin in metal layer 3, placement grid m3pg that is defined by the track patterns of metal layer 2 and metal layer 3.

In one embodiment, if the circuit element has any sub-element that is assigned with a coarser placement grid than the placement grid of the circuit element, the placement of the circuit element is changed to the coarser placement grid.

In one embodiment, if the circuit element is not assigned with any placement grid because it does not have any pins, the circuit element may be assigned to a placement grid based on factors such as the size (i.e., area) of the circuit element and a logical pin count of the circuit element. For example, the size of the block can be the primary factor and the logical pin count can be the secondary factor. As the size of the circuit element increase and/or the number of the logical pin count increase, the circuit element is assigned with a coarser placement grid. The placement grid to be assigned relative to the size of the circuit element and the logical pin count can be stored in a lookup table. The lookup table may be modified by a user.

Example Process for Application to Standard-cell Placement for Advanced Nodes

Figure 7:
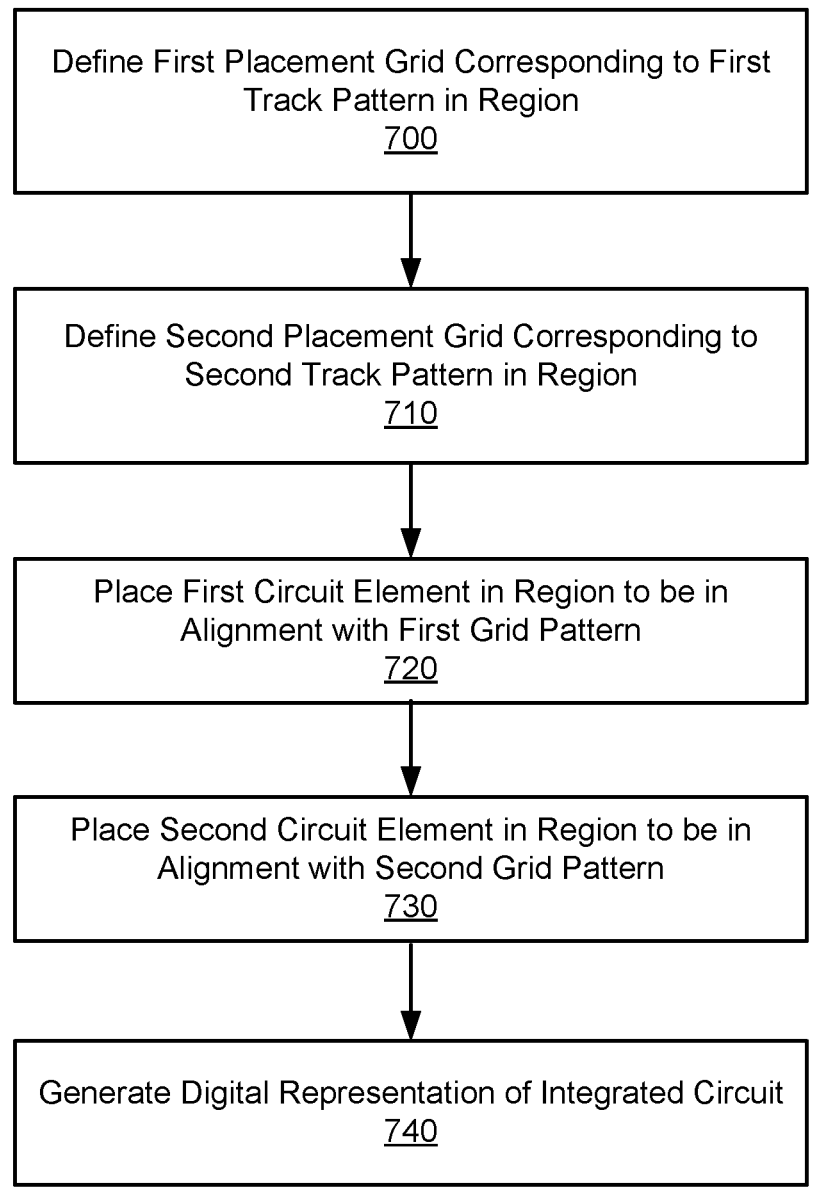
FIG. 7 is a flowchart illustrating a process for placing circuit elements using placement grids customized for a region, in accordance with an embodiment.

FIG. 7 is a flowchart illustrating a process for placing circuit elements using placement grids customized for a region, in accordance with an embodiment. A first placement grid corresponding to a first repeating non-uniform track pattern of a given metal layer in a region of the integrated circuit is defined 700 by the grid definition module 312. The first placement grid may have a vertical or horizontal pitch that corresponds to a vertical or horizontal pitch of the first repeating non-uniform track pattern, and a horizontal or vertical that corresponds to a horizontal or vertical pitch of a track pattern in a lower (or upper) metal layer adjacent to the given metal layer.

A second placement grid corresponding to a second repeating non-uniform track pattern of another given metal layer in the region of the integrated circuit is defined by the grid definition module 312. The other given metal layer is a metal layer higher than the given metal layer of the first placement grid, and hence, the second placement grid is coarser than the first placement grid. The second placement grid may have a vertical or horizontal pitch that correspond to a vertical or horizontal pitch of the second repeating non-uniform track pattern of the other given metal layer, and a horizontal or vertical that corresponds to a horizontal or vertical pitch of a track pattern in a lower (or upper) metal layer adjacent to the other given metal layer.

A first circuit element is assigned with the first placement grid based, for example, on location of its physical pins, the size of the first circuit element and the number of logical pins. Then, the first circuit element is placed 720 in alignment with the first placement grid. In one embodiment, an origin point of the first circuit element is snapped onto a grid point where a vertical line and a horizontal line of the first placement grid intersect.

A first circuit element is assigned with the second placement grid based, for example, on location of its physical pins, the size of the second circuit element and the number of logical pins. Then, the second circuit element is placed 730 in alignment with the second placement grid. In one embodiment, an origin point of the second circuit element is snapped onto a grid point where a vertical line and a horizontal line of the second placement grid intersect.

A digital representation of the IC with the first circuit element aligned to the first placement grid and the second circuit element aligned to the second placement grid is generated 740 for storing as modified layout data 354 in the layout design database 350.

The steps and the sequence of steps shown in FIG. 7 is merely illustrative and various modifications may be made. For example, placing 720 the first circuit element may appear after defining 700 the first placement grid but before defining 710 second placement grid. Also, the first placement grid may be defined 700 in parallel with defining 710 of the second placement grid. Further, although FIG. 7 illustrates only two circuit elements being placed in the IC, in practice, many more circuit elements may be placed in the IC.

Hierarchical Placement of Circuit Elements

Figure 8:
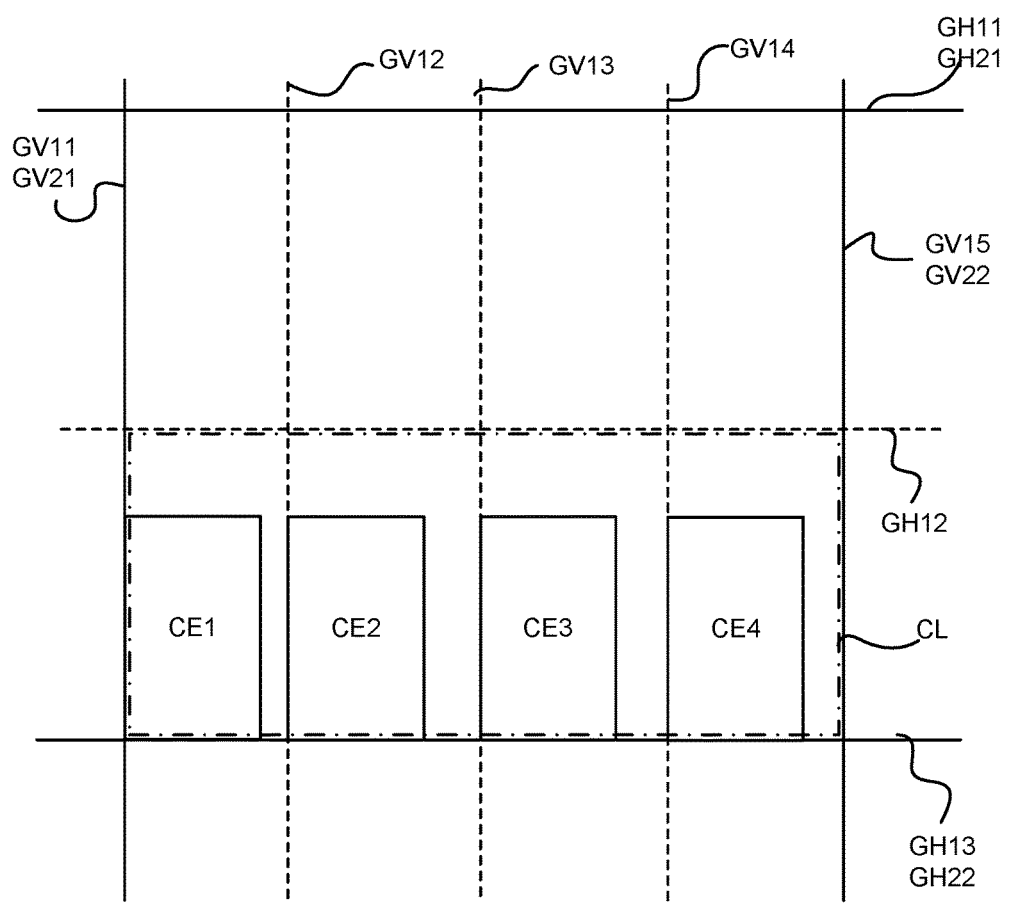
FIG. 8 is a diagram illustrating hierarchical placement of circuit elements and a cluster, according to one embodiment.

FIG. 8 is a diagram illustrating a hierarchical placement of circuit elements CE1 through CE4 and a cluster CL grouping these circuit element, according to one embodiment. In FIG. 7, circuit elements CE1 through CE4 are assigned to a finer placement grid including vertical lines GV11, GV12, GV13, GV14, GV15 and horizontal lines GH11, GH12, GH13.

After the circuit elements CE1 through CE4 are placed on the finer placement grid, a user may designate these circuit elements as a cluster CL of a higher hierarchy. After designating the circuit elements CE1 through CE4 as a cluster CL, the entire cluster CL may be assigned to a coarser placement grid including vertical lines GV21, GB22 and horizontal lines GH21, GH22. Such assignment of the cluster CL with the coarser placement grid may be performed automatically by the block decoration module 314 or by user input received through the input device 210, 214.

Based on the assignment, the cluster CL or a copy of the cluster CL may be conveniently placed on the IC to be in alignment with the coarser placement grid, which ensures routability of its member circuit elements CE1 through CE4. As shown in the example of FIG. 8, the placement grid scheme is compatible with the hierarchical designing scheme for ICs. Although only two levels of hierarchy are illustrated in FIG. 8, in other embodiments, more than two levels of hierarchy may be implemented. In such case, a circuit component of a higher hierarchy may be assigned with a coarser placement grid.

Alternative Embodiments

In advanced nodes, row-based standard-cell placement can no longer be carried out with the assumption that all the cells can be placed on one single uniform grid defined as the greatest common divisor of the widths of all the cells. There are at least two and possibly more 1D placement grids and the standard-cells are pre-assigned based on their layout to one of those. In one embodiment, the layout editor system 300 handles such case as simply a sub-problem of the placement approach described above.

Devices like transistors and resistors in custom design are usually designed using parameterized cells, pcells for short. Recent approaches to placement of pcells are following more and more closely the row-based paradigm that has been so successful in digital design. In such a placement problem, the x-coordinate of a pcell is usually determined by a design rule on a device layer like poly. Similarly, the y-coordinate of rows of devices is also determined, to first order, by a similar design rule on a device layer like diffusion. Such rules are already handled by existing layout editor tools. However, when rows of devices are stacked vertically, a gridded placement problem may be encountered. In this case, the placement grid (comprised of horizontal grid lines) is derived from the track pattern corresponding to the lowest metal layer used for horizontal wiring.

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A method of designing an integrated circuit, comprising:

defining a first placement grid corresponding to a first repeating non-uniform track pattern of a metal layer in a region of the integrated circuit;

defining a second placement grid corresponding to a second repeating non-uniform track pattern of another metal layer in the region of the integrated circuit, the second placement grid coarser than the first placement grid;

determining, by a processor, whether a first circuit element in the region has a pin in the metal layer;

placing, by the processor, the first circuit element in alignment with the first placement grid responsive to the first circuit element having the pin in the metal layer;

determining whether a second circuit element in the region has a pin in another metal layer;

placing the second circuit element in alignment with the second placement grid responsive to the second circuit element having the pin in the other metal layer;

determining a size of a third circuit element and a number of logical pins in the third circuit element, the circuit element not having a pin in the metal layer or the other metal layer;

selecting, by the processor, the first placement grid or the second placement grid as a placement grid for a third circuit element in the region based on the size of the third circuit element and the number of logical pins in the third circuit element responsive to the circuit element not having the pin in the metal layer or the other metal layer; and generating a digital representation of the integrated circuit with the first circuit element aligned according to the first placement grid, the second circuit element aligned according to the second placement grid, and the third circuit element according to a selected one of the first placement grid and the second placement grid.

2. The method of claim 1, wherein the first placement grid is defined using a first placement grid definition corresponding to a first track group definition of the metal layer of the region, the second placement grid is defined using a second placement grid definition corresponding to a second track group definition of the other metal layer of the region, the first track group definition indicating at least widths of tracks and spacing between the tracks of the first repeating non-uniform track, and the second track group definition indicating at least widths of tracks and spacing between tracks of the second repeating non-uniform track.

3. The method of claim 2, wherein the track group definition is included in a region definition that defines attributes of the region.

4. The method of claim 2, wherein the first placement grid is defined automatically to have a horizontal pitch corresponding to a horizontal pitch of the first repeating non-uniform track pattern, and the second placement grid is defined automatically to have a horizontal pitch corresponding to a horizontal pitch of the second repeating non-uniform track pattern, wherein tracks in the first repeating non-uniform track pattern and the second repeating non-uniform track pattern extends vertically.

5. The method of claim 2, wherein the first placement grid is defined automatically to have vertical pitch corresponding to a vertical pitch of the first repeating non-uniform track pattern, and the second placement grid is defined automatically to have a vertical pitch corresponding to a vertical pitch of the second repeating non-uniform track pattern, wherein tracks in the first repeating non-uniform track pattern and the second repeating non-uniform track pattern extends horizontally.

6. The method of claim 2, wherein the first placement grid is further defined by a track pattern in a lower metal layer below the metal layer, and the second placement grid is further defined by a track pattern in another lower metal layer below the other metal layer.

7. The method of claim 1, further comprising displaying graphical user elements for selecting the first placement grid or the second placement grid as the placement grid for a fourth circuit element that includes the first circuit element and the second circuit element.

8. The method of claim 1, further comprising receiving a user selection on the first placement grid or the second placement grid as a placement grid for a fourth circuit element that includes the first circuit element and the second circuit element.

9. The method of claim 1, further comprising:
determining the first placement grid as a placement grid for a fourth circuit element in the region responsive to the third circuit element not having a sub-element assigned with the second placement grid; and
determining the second placement grid as a placement grid for the fourth circuit element responsive to the fourth circuit element having at least one sub-element assigned with the second placement grid.

10. The method of claim 1, wherein the other metal layer is above the metal layer in the integrated circuit.

11. The method of claim 1, wherein a location on the first placement grid for placing the first circuit element and a location on the second placement grid for placing the second circuit element are determined automatically.

12. The method of claim 1, wherein a horizontal pitch or a vertical pitch of the second grid pattern is an integer times of a horizontal pitch or a vertical pitch of the second grid pattern.

13. A non-transitory computer-readable storage medium storing instructions thereon, the instructions when executed by a processor causing the processor to:
define a first placement grid corresponding to a first repeating non-uniform track pattern of a metal layer in a region of an integrated circuit;
define a second placement grid corresponding to a second repeating non-uniform track pattern of another metal layer in the region of the integrated circuit, the second placement grid coarser than the first placement grid;
determine whether a first circuit element in the region has a pin in the metal layer;
place the first circuit element in alignment with the first placement grid responsive to the first circuit element having the pin in the metal layer;
determine whether a second circuit element in the region has a pin in another metal layer;
place the second circuit element in alignment with the second placement grid responsive to the second circuit element having the pin in the other metal layer;
determine a size of a third circuit element and a number of logical pins in the third circuit element, the circuit element not having a pin in the metal layer or the other metal layer;
select the first placement grid or the second placement grid as a placement grid for a third circuit element in the region based on the size of the third circuit element and the number of logical pins in the third circuit element responsive to the circuit element not having the pin in the metal layer or the other metal layer; and
generate a digital representation of the integrated circuit with the first circuit element aligned according to the first placement grid, the second circuit element aligned according to the second placement grid, and the third circuit element according to a selected one of the first placement grid and the second placement grid.

14. The non-transitory computer-readable storage medium of claim 13, wherein the first placement grid is defined using a first placement grid definition corresponding to a first track group definition of the metal layer of the region, the second placement grid is defined using a second placement grid definition corresponding to a second track group definition of the other metal layer of the region, the first track group definition indicating at least widths of tracks and spacing between the tracks of the first repeating non-uniform track, and the second track group definition indicating at least widths of tracks and spacing between tracks of the second repeating non-uniform track.

15. The non-transitory computer-readable storage medium of claim 13, wherein the first placement grid is defined automatically to have a horizontal pitch or a vertical pitch corresponding to a horizontal pitch or a vertical pitch of the first repeating non-uniform track pattern, and the second placement grid is defined automatically to have a horizontal pitch or a vertical pitch corresponding to a horizontal pitch or a vertical pitch of the second repeating non-uniform track pattern.

16. The non-transitory computer-readable storage medium of claim 13, wherein the first placement grid is further defined by a track pattern in a lower metal layer below the metal layer, and the second placement grid is further defined by a track pattern in another lower metal layer below the other metal layer.

\* \* \* \* \*